1

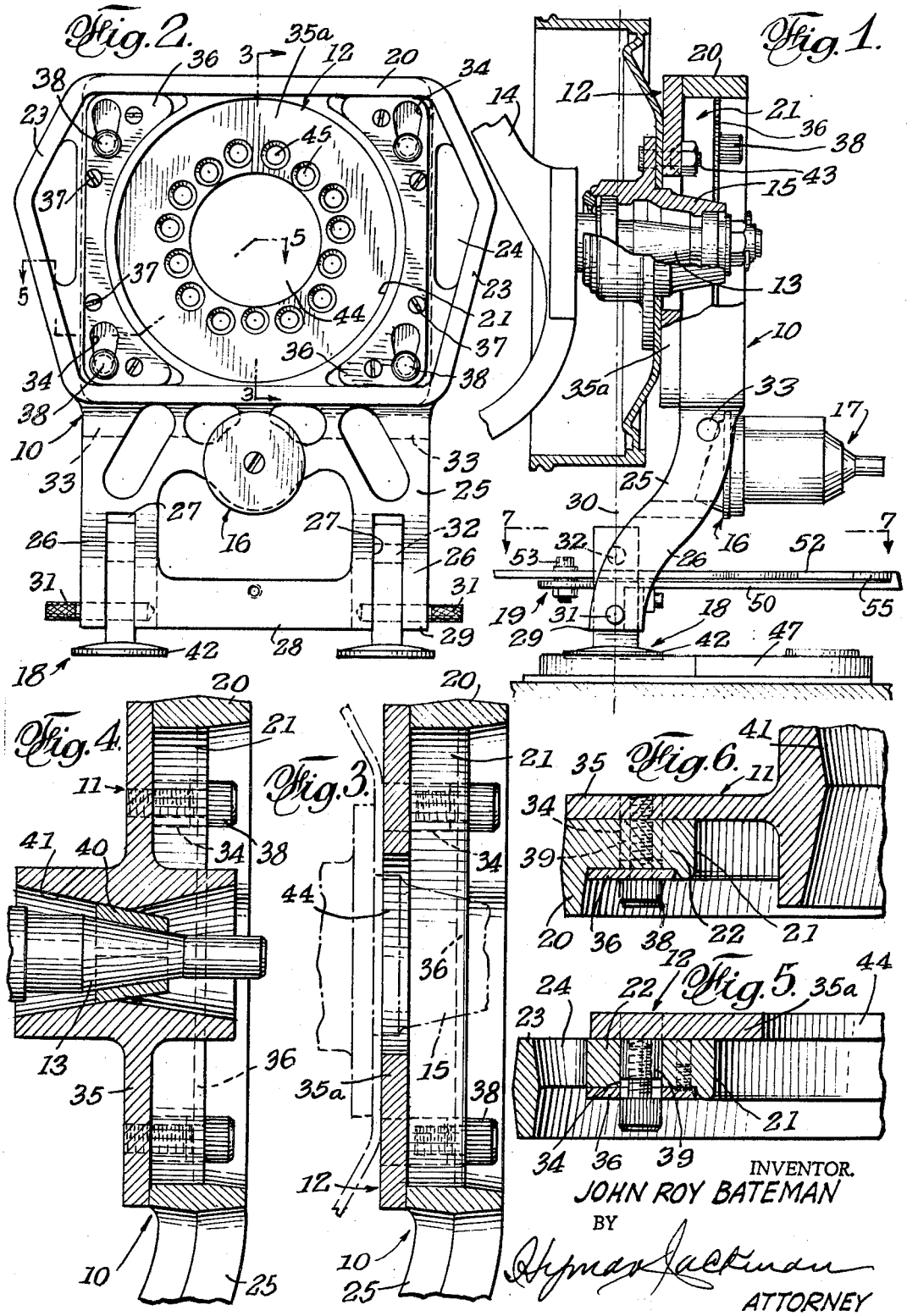

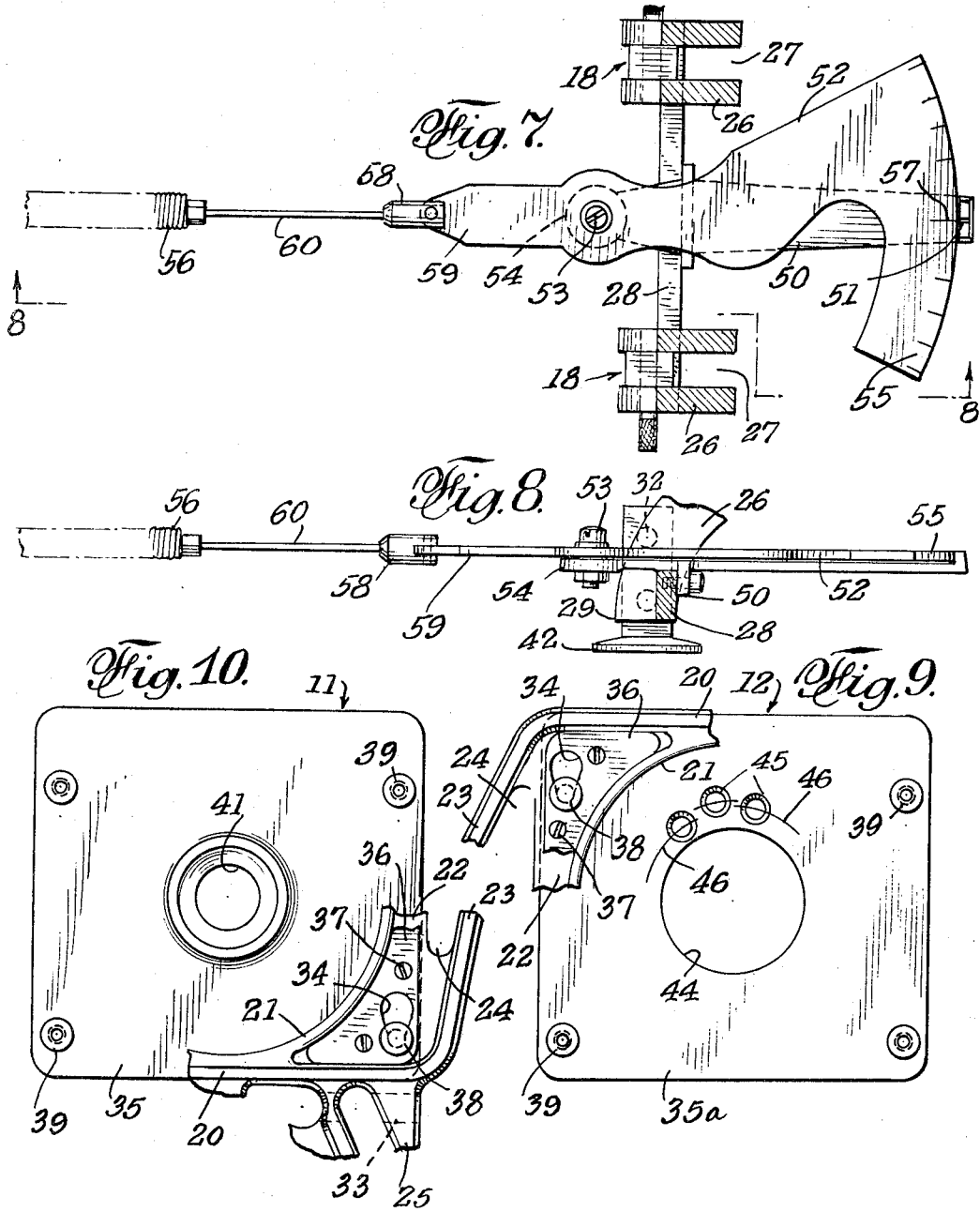

3,488,857
WHEEL ALIGNER FOR AUTOMOTIVE VEHICLES
John Roy Bateman, 5217 Hollywood Blvd.,
Hollywood, Calif. 90027
Filed Feb. 17, 1969, Ser. No. 799,726
Int. Cl. G01b 5/255
U.S. Cl. 33—203.18                                                 5 Claims

ABSTRACT OF THE DISCLOSURE

Wheel aligner apparatus having support legs with interchangeable adapters for connection either to spindles of the steerable wheels of an automotive vehicle or to the drums that ordinarily mount the wheels, which are offset to compensate for wheel offset, adjustable to tire size, and are provided with wheel-turning leverage handles, and further provided with toe gauge connection means.

BACKGROUND OF THE INVENTION

Field of the invention

In automotive repair and maintenance, checking the camber, caster and toe-in of the steerable wheels of an automotive vehicle.

Description of the prior art

The present aligner embodies features that are improvements over the aligning tool disclosed in U.S. Patent No. 2,846,774.

SUMMARY OF THE INVENTION

The present wheel aligner comprises, generally, two support legs 10; interchangeable mounting adapter assemblies 11 and 12 for selectively connecting said legs, as required, either directly to the spindles 13 that mount the wheels and brake drums on the wheel suspension assemblies 14 on either side of the auto, or to the hubs 15 which mount said brake drums and wheels; a mount 16 on each support leg for magnetically mounting a camber-measuring element 17; adjustable support feet 18 for varying the operative height of the support legs for autos having different sizes of wheels and tires; and a toe gauge 19 connected to and extending between said support legs.

The primary object of the invention is to provide alignment-testing means as above characterized and embodying the above generally described features, and further providing means on the support legs for easy manual turning adjustment thereof, and also so offsetting the feet-provided portions of the support legs as to enable application of the aligners to an automotive vehicle with the feet thereof transversely spaced on the tread gauge of the auto tires.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

BRIEF DESCRIPTION OF THE DRAWINGS

FIG. 1 is a vertical sectional view of one of the present support legs fitted with an adapter assembly for connection to the brake drum and bearing hub on the wheel suspension on one side of an automotive vehicle.

FIG. 2 is a front elevational view of said support leg.

FIG. 3 is an enlarged vertical sectional view as taken on the plane of line 3—3 of FIG. 2.

FIG. 4 is a similar sectional view of a leg provided with an alternative adapter assembly for connection directly to the hub-mounting spindle of a wheel suspension.

FIG. 5 is a cross-sectional view as taken on the plane of line 5—5 of FIG. 2.

FIG. 6 is an approximately similar cross-sectional view of the leg and adapter shown in FIG. 4.

FIG. 7 is a plan sectional view as taken on the plane of the line 7—7 of FIG. 1.

FIG. 8 is a longitudinal sectional view of the means shown in FIG. 7.

FIG. 9 is an outer face view of the adapter assembly shown in FIGS. 1 and 2 with a fragmentary portion of the support leg in assembled relationship.

FIG. 10 is an outer face view of the adapter assembly shown in FIG. 4.

DESCRIPTION OF THE PREFERRED EMBODIMENT

It will be clear that the above-described views are of aligned means engaged with the front right wheel suspension of an automotive vehicle and that the portions of the means engaged with the front left wheel are similar but of the opposite hand.

The support leg 10 shown is preferably formed as an aluminum casting comprising a mounting portion formed as a frame 20 having an enlarged central opening 21 formed in a transverse wall 22 within said frame. Said frame, on the opposite sides thereof, has laterally bowed handle portions 23 that define openings 24 that accommodate the fingers of the hands of the user, which grip said portions 23 in the process of turning the support leg horizontally on the usual kingbolt or other pivot joint by which the suspension assembly is connected to the vehicle.

The leg 10 that is shown is provided with a support portion 25 from which the frame 20 extends upwardly, the same being divided into two legs 26, each having a bifurcating recess 27 opening at the bottom, said legs 26 being joined by a transverse portion 28. A feature of said support portion 25 is that the lower end 29 thereof is rearwardly offset from the general plane of the frame 20. The dot-dash line 30 of FIG. 1 represents the transverse central plane of the tire of the wheel which was replaced by the present support leg 10 so testing and measuring of the various movements of the spindle 13, as supported by said support leg rather than as supported by the wheel, may be effected. In other words, the inward offset 29 of the support legs 10, on both sides, duplicates the width of the tread of the front tires during testing.

The mount 16 for the camber-measuring element 17 is shown as a plate magnet that is secured to the leg 10 centrally beneath the frame 20 thereof. Each leg 26 in its bifurcation 27 is fitted with a foot 18, the same, by means of a keeper pin 31, being engaged with one of two or more selective holes 32 in said foot, providing for approximate height adjustment of the support leg according to the size of the wheel that has been removed. Other features provided in the support leg 10 are transverse holes 33 for leverage-providing bars used in instances where difficulty of manual turning of the leg is encountered. Also, the mentioned transverse wall 22 is provided with one or more keyholes 34, required in connection with affixing either of the adapter assemblies 11 and 12.

The assembly 11 is shown as a back plate 35 engaged with the rear face of the wall 22, a pair of backup plates 36 engaged with the front face of said wall 22 and secured to said wall by means such as screws 37 and having keyholes therein matching the keyholes 34 in the wall 22, and a set of cap bolts 38 engaged in said matched keyholes and threadedly connected to bosses 39 on the back plate 35.

In the adapter assembly 11, which mounts directly on the wheel spindle 13 (FIGS. 4 and 6), a split collet 40 in a conical central bore 41, or other suitable connecting means, separably connects said assembly and, thus, the support leg 10, to said spindle. Thus, with the pads 42 on the feet 18 engaged with a shiftable base plate 47, the support leg 10 may be moved in the various manners necessary to move the spindle 13 on its pivotal mount to test or check for proper camber, caster and toe-in of a wheel secured to the hub 15 that is ordinarily mounted on the spindle.

In instances requiring or desiring use of the adapter assembly 12 for connecting the support leg 10 to the wheel suspension by means of the usual wheel-mounting studs 43 on the hub 15 that is rotationally mounted on said spindle 13, the back plate 35a of said assembly 12 is provided with a central hole 44 to accommodate said hub. A set of five such studs is ordinarily provided for mounting a wheel. However, these studs, in different autos with wheels varying in diametral size, while uniformly circumferentially spaced, vary in three main bolt circuit spacings. Consequently, in order that the plate 35a may be secured to the studs 43 of such differently spaced studs, the same is provided with three sets of five holes 45 arranged on bolt circles 46 corresponding to the bolt circle spacings above mentioned. A support leg 10, thus mounted, may be moved on all of the test movements that are described above in connection with a leg 10 provided with an adapter assembly 11.

The toe gauge 19 that is illustrated is shown as a bracket 50 having its end provided with an index mark 51, said bracket being affixed to the leg-connecting portion 28 of the support leg. A toe gauge indicator 52 is shown as mounted on a pivot 53 to an inreaching extension 54 of the bracket 50. Said indicator 52 has a calibrated end 55 that may be read in connection with the index mark 51 to show toe-in. Since the tension spring 56 keeps the indicators 52 on opposite sides of the auto aligned, the middle calibration marks 57 will retain their relationship with the index marks 51. The ends of the spring 56 are connected by clevises 58 to the respective ends 59 of the indicators 52 on both sides. In this case, an extension rod 60 connects each clevis with a spring end. Any change in the angle of the support legs 10, on both sides, can be read by displacement of marks 51 relative to marks 57. The degree of displacement on either side, whether the same or different, may be read in connection with the other calibration marks on the indicators 52.

It will be clear that the above-described means is used on both sides of the auto and the only connection therebetween is the spring 56.

While this disclosure is based on the front and/or steerable wheels of an automobile, it will be understood that front, or rear wheels of the types that are in suspension, whether in automotive vehicles, trailers or other types of vehicles, may be tested thereby.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. Wheel aligner apparatus for the steerable wheels of an automotive vehicle comprising:
   (a) a support leg adapted for removable connection to the wheel-mounting part of each of the wheel suspensions from which the wheel thereof has been removed,
   (b) adjustable foot means on the lower portion of each said support leg for engagement with a support surface,
   (c) said lower portion of each support leg being offset whereby the foot means engage said support surfaces at approximately the same area of engagement as that at which the tire of the removed wheel would have engaged said surface,
   (d) the upper portion of each support leg being provided with a transverse wall having an enlarged central opening therein, said opening being defined by lateral portions of said wall,
   (e) a back plate for engagement with a component of the wheel assembly of the wheel-mounting part and disposed across the back face of said wall portions, and
   (f) slot and bolt means separably connecting said back plate and said upper portion of each support leg,
   (g) the back plate being provided with means for separably affixing said plate to the mentioned wheel-mounting part of each of the wheel suspensions.

2. Wheel aligner apparatus as defined in claim 1 in which:
   (a) the back plate is provided with a central hole to freely accommodate said wheel-mounting part of each wheel suspension,
   (b) means for separably affixing the back plate to the wheel-mounting part comprising a set of uniformly spaced studs on the latter part adapted to extend through registering holes in the back plate, and
   (c) a clamp nut on each stud in clamping engagement with the back plate.

3. Wheel aligner apparatus as defined in claim 1 in which:
   (a) the back plate is provided with a central hole to freely accommodate said wheel-mounting part of each wheel suspension, and
   (b) means for separably affixing the back plate to the wheel-mounting part comprising split collet means interengaging said back plate and wheel-mounting part.

4. Wheel aligner apparatus as defined in claim 1 in which:
   (a) the back plate has an enlarged central opening receptive of a hub component of the wheel assembly,
   (b) plural sets of holes around said opening, each on a different bolt circle generated around the center of the mentioned opening, and
   (c) a plurality of bolts equal in number to the number of holes in each set thereof for fixedly connecting the support leg by means of the back plate to the mentioned hub component.

5. Wheel aligner apparatus as defined in claim 1 in which:
   (a) the back plate is provided with a central conical bore receptive of a spindle component of the wheel assembly, and
   (b) tapered collet means to interengage said spindle component and the wall of said conical bore, thereby fixedly connecting the support leg and the spindle component.

References Cited

UNITED STATES PATENTS 2,780,875  2/1957  Carr _____ 33—203.18

FOREIGN PATENTS 164,767  8/1955  Australia.

OTHER REFERENCES

"Racealigner," Raceway Mfg. Limited, received in Patent Office, Jan. 3, 1958.

WILLIAM D. MARTIN, JR., Primary Examiner

U.S. Cl. X.R.

33—203.12